(12) United States Patent
Woodell

(10) Patent No.: US 7,576,680 B1
(45) Date of Patent: Aug. 18, 2009

(54) PULSE PATTERN FOR WEATHER PHENOMENON AND INCURSION DETECTION SYSTEM AND METHOD

(75) Inventor: Daniel L. Woodell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 246 days.

(21) Appl. No.: 11/501,403

(22) Filed: Aug. 9, 2006

(51) Int. Cl.
*G01S 13/93* (2006.01)
*G01S 13/95* (2006.01)

(52) U.S. Cl. .................. 342/33; 342/26 B; 342/158

(58) Field of Classification Search ........... 342/26 B, 342/29–35, 36–40, 26 R, 26 C, 26 D, 63, 342/158
See application file for complete search history.

(56) References Cited

U.S. PATENT DOCUMENTS

| | | | | |
|---|---|---|---|---|
| 3,775,766 | A | * | 11/1973 | Gendreu et al. ............ 342/33 |
| 3,781,878 | A | | 12/1973 | Kirkpatrick |
| 3,885,237 | A | | 5/1975 | Kirkpatrick |
| 4,259,658 | A | | 3/1981 | Basov et al. |
| 4,835,536 | A | | 5/1989 | Piesinger et al. |
| 5,077,558 | A | | 12/1991 | Kuntman |
| 5,198,819 | A | | 3/1993 | Susnjara |
| 5,311,183 | A | | 5/1994 | Mathews et al. |
| 5,654,890 | A | * | 8/1997 | Nicosia et al. ............ 701/16 |
| 5,661,486 | A | | 8/1997 | Faivre et al. |
| 5,907,568 | A | * | 5/1999 | Reitan, Jr. ............ 342/26 B |
| 5,945,926 | A | | 8/1999 | Ammar et al. |
| 5,990,824 | A | * | 11/1999 | Harrison ............ 342/160 |
| 6,018,698 | A | | 1/2000 | Nicosia et al. |
| 6,201,494 | B1 | | 3/2001 | Kronfeld |
| 6,236,351 | B1 | | 5/2001 | Conner et al. |
| 6,311,108 | B1 | * | 10/2001 | Ammar et al. ............ 701/16 |
| 6,388,607 | B1 | | 5/2002 | Woodell |
| 6,388,608 | B1 | | 5/2002 | Woodell et al. |
| 6,424,288 | B1 | | 7/2002 | Woodell |
| 6,456,226 | B1 | | 9/2002 | Zheng et al. |
| 6,512,476 | B1 | | 1/2003 | Woodell |
| 6,591,171 | B1 | | 7/2003 | Ammar et al. |
| 6,597,305 | B2 | | 7/2003 | Szeto et al. |
| 6,603,425 | B1 | | 8/2003 | Woodell |
| 6,606,563 | B2 | | 8/2003 | Corcoran, III |
| 6,690,317 | B2 | | 2/2004 | Szeto et al. |
| 6,850,185 | B1 | | 2/2005 | Woodell |
| 6,879,280 | B1 | | 4/2005 | Bull et al. |
| 6,882,302 | B1 | | 4/2005 | Woodell et al. |
| 7,042,387 | B2 | | 5/2006 | Ridenour et al. |
| 2002/0089432 | A1 | | 7/2002 | Staggs et al. |

(Continued)

OTHER PUBLICATIONS

U.S. Appl. No. 11/486,774, filed Jul. 14, 2006, Woodell et al.

(Continued)

*Primary Examiner*—Thomas H Tarcza
*Assistant Examiner*—Cassi Galt
(74) *Attorney, Agent, or Firm*—Daniel M. Barbieri

(57) ABSTRACT

An aircraft radar system includes a radar antenna and a processing device. The processing device receives returns from the radar antenna associated with the scan. The processing device uses the returns from the scan for use in both incursion detection and weather phenomenon detection. A method for using the returns from the scan for both incursion detection and weather phenomenon detection is also disclosed.

15 Claims, 4 Drawing Sheets

U.S. PATENT DOCUMENTS

| | | |
|---|---|---|
| 2002/0147544 A1 | 10/2002 | Nicosia et al. |
| 2002/0163461 A1 | 11/2002 | Smithey |
| 2003/0016156 A1 | 1/2003 | Szeto et al. |
| 2003/0225487 A1 | 12/2003 | Robert et al. |
| 2003/0227395 A1 | 12/2003 | Zeineh |

OTHER PUBLICATIONS

U.S. Appl. No. 10/941,616, filed Sep. 15, 2004, Woodell et al.

Jones, Denise R., "Runway Incursion Prevention System Simulation Evaluation", presented at 21st Digital Avionics Conference, Irvine, CA, Oct. 27-31, 2002, 12 pages.

Young, S.D. et al., "Runway Incursion Prevention: A Technology Solution", presented at the Joint Meeting of the Flight Safety Foundation's 54th Annual International Air Safety Seminar, the International Federation of Airworthiness' 31st International Conference, and the International Air Transport Association, Athens, Greece, Nov. 5-8, 2001, cover page and pp. 221-237.

Zipser, E. et al., "The Vertical Profile of Radar Reflectivity of Convective Cells: A Strong Indicator of Storm Intensity and Lightning Probability?", American Meteorological Society, 1994, pp. 1751-1759.

* cited by examiner

PULSE PATTERN FOR WEATHER PHENOMENON AND INCURSION DETECTION SYSTEM AND METHOD

BACKGROUND

The present application relates generally to a weather radar system. More particularly, the present application relates to an airborne radar or other airborne sensor system which is capable of detecting obstacles on a runway when an aircraft is in a take-off mode, a landing mode, or a taxi mode and which is capable of detecting a weather phenomenon.

Incursion systems, such as runway incursion systems, are utilized to determine if an obstacle is in the path of an aircraft or other vehicle. Conventional runway incursion systems are generally one of two types. The first type utilizes signals cooperatively provided from the obstacle on the runway; the second type utilizes radar or other electromagnetic energy signals to actively sense the presence of an obstacle on the runway without the obstacles active cooperation.

U.S. Pat. No. 6,850,185, entitled, "Runway Obstacle Detection System and Method" invented by Woodell and assigned to the Assignee of the present application describes an example of the second-type of conventional runway incursion system. U.S. Pat. No. 6,850,185 describes a weather radar system that utilizes active sensing of obstacles by transmitting electromagnetic beams and receiving the beam that bounces off obstacles in the path of the aircraft. The weather radar system is also capable of detecting weather phenomena. U.S. application Ser. No. 10/941,616 filed by Woodell et al. on Sep. 15, 2004 and assigned to the Assignee of the present application also discloses a weather radar system capable of detecting obstacles on a runway as well as weather phenomena. U.S. Pat. No. 6,850,185 and U.S. patent application Ser. No. 10/941,616 are incorporated herein by reference. U.S. patent application Ser. No. 11/486,774 entitled, "Combined Runway Obstacle Detection System and Method," filed Jul. 14, 2006 by Woodell et al., incorporated herein by reference and assigned to the Assignee of the present application discloses a runway incursion system using principles of the first and second type.

Conventional aircraft weather radar systems are capable of scanning for certain weather phenomena, such as windshear, turbulence or micro-burst situations. U.S. Pat. No. 6,388,608 assigned to the Assignee of the present application and incorporated herein by reference discloses a weather radar system with windshear detection capabilities. U.S. Pat. No. 6,388,608 discloses an embodiment that detects turbulence or windshear by scanning at two or more tilt angles and determining wind speeds at various elevations. A gradient of average wind speed is determined and compared to predetermined known gradients. When a match is made, the known vertical shear components are removed and the resulting data is used to detect turbulence.

Detecting windshear, turbulence and/or micro-burst situations requires that the weather radar scan the area and process weather radar returns to determine if the windshear, turbulence or micro-burst situation is present. Windshear, turbulence or micro-burst warnings are generally very desirous when the airplane is in the landing, taxi and take-off modes. However, scanning for weather phenomenon, such as, windshear, turbulence and/or micro-bursts and the subsequent analysis for the phenomenon generally requires a significant amount of scanning time, processing time, and processing power.

Detecting runway incursions generally also requires a significant amount of scanning time, processing time, and processing power. Like detecting certain weather phenomenon, detecting runway incursions is desirous during the landing, take-off, and taxi modes. Accordingly, weather radar systems have a limited amount of time to sample the weather environment to support weather phenomenon warning functions and to sample the runway and taxiway to support runway incursion warning functions.

Accordingly, there is a need for a scanning strategy that reduces the amount of time required to detect weather phenomena, such as windshear (e.g. microbursts) and/or turbulence, and runway incursion. There is also a need for a radar system that removes redundant functions associated with weather detection and runway or taxiway obstacle detection. Further, there is a need for a cost effective system for and method of runway obstacle detection and weather detection. Yet further there is a need for an efficient process of detecting runway and taxiway incursions and weather phenomena that is important to take-off, taxi, and landing modes.

SUMMARY

An exemplary embodiment relates to an aircraft radar system. The aircraft radar system includes a radar antenna and a processing device. The processing device receives returns from the radar antenna. The returns are associated with a scan. The processing device uses the returns from the scan to provide data for use in both incursion detection and weather phenomenon detection.

Another exemplary embodiment relates to a sensing system for an aircraft. The sensing system includes means for receiving returns associated with a scan, means for providing data in response to the scan, and means for providing warnings in response to the data. The warnings can be a turbulence, windshear or micro-burst warning, or a runway or taxiway obstacle warning. The warnings are at least partially provided in response to the data.

Still another exemplary embodiment relates to a method of detecting an obstacle on a runway or taxiway and detecting weather phenomenon in take-off and landing modes. The method includes performing a first scan in a first scan pattern, and obtaining data from the first scan. The data includes Doppler closing function data. The method also includes detecting an obstacle on a runway or taxiway and detecting weather phenomenon using the Doppler closing function data.

Alternative examples and other exemplary embodiments relate to other features and combination of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which.

DETAILED DESCRIPTION OF PREFERRED AND EXEMPLARY EMBODIMENTS

Figure 1:
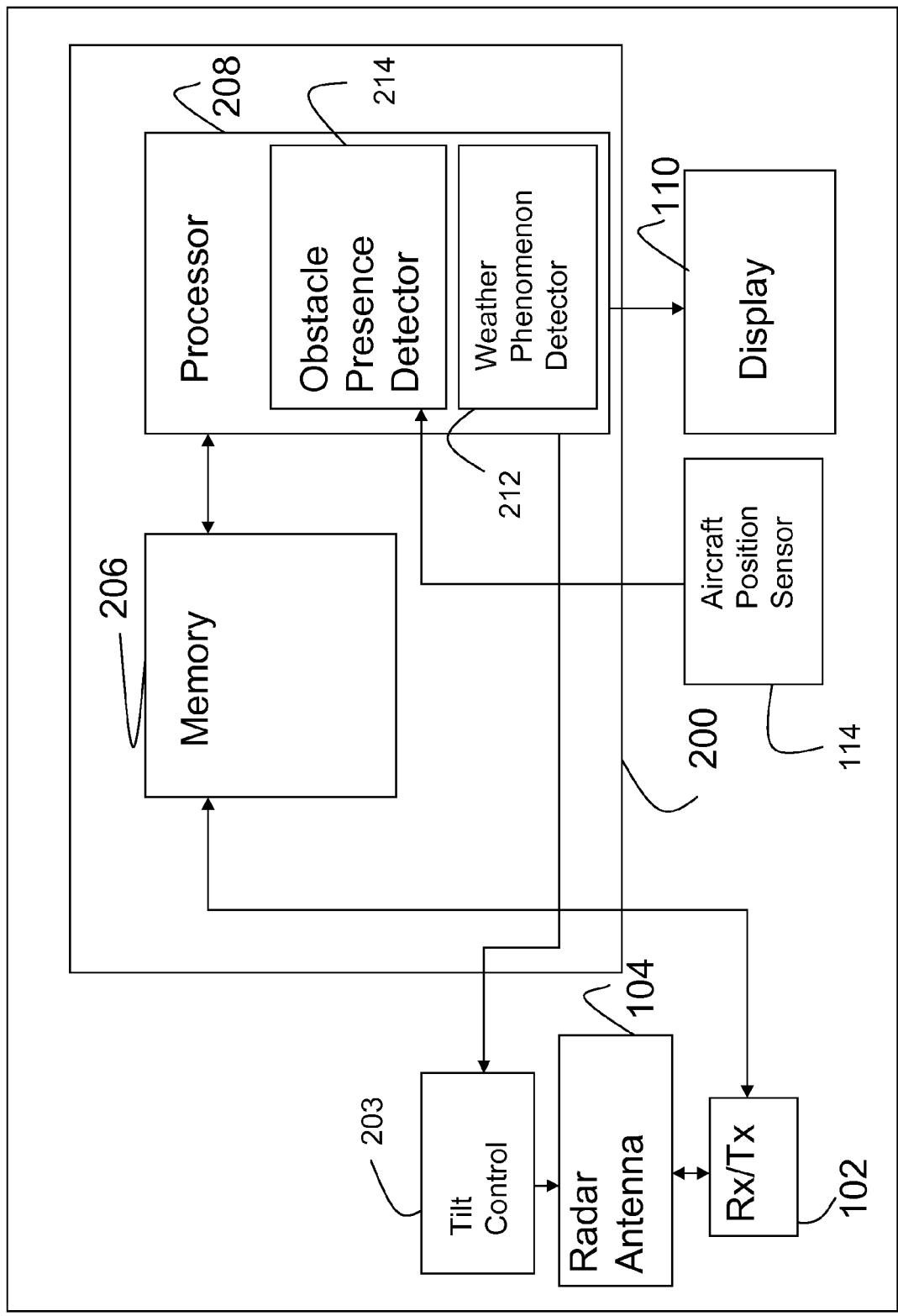
FIG. 1 is a general block diagram of a weather radar system in accordance with an exemplary embodiment.

Before describing in detail the particular improved system and method, it should be observed that the invention includes, but is not limited to a novel structural combination of conventional data/signal processing components and sensing circuits, and not in the particular detailed configurations thereof. Accordingly, the structure, methods, functions, control and arrangement of conventional components and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

With reference to FIG. 1, weather radar system 100 advantageously includes an obstacle presence detector 114 to detect a presence and location of obstacles in a path of the aircraft and a weather phenomenon detector 212 to detect weather phenomenon, such as a weather hazard. In one embodiment, the path of the aircraft is a runway and the weather phenomenon is windshear (e.g., microburst) or turbulence.

The obstacles and weather phenomenon can be detected before or during takeoff and before or during and after landing in one embodiment. System 100 can be utilized during taxi as well. Detectors 212 can also be utilized throughout flight.

System 100 advantageously combines the warning operations of obstacle presence detector 114 and weather phenomenon detector 212 to provide an efficient detection of obstacles and weather phenomenon (e.g., hazards). Advantageously, system 100 utilizes a scan pattern for both obstacle presence detector 114 and weather phenomenon detector 212. By using the scan pattern, system 100 saves scanning and processing time for providing weather phenomenon warnings and obstacle presence warnings.

In one embodiment, the scan pattern that is used by both detector 114 and detector 212 is a Doppler closing function which scans the majority of the environment. The scan pattern includes an antenna scan pattern and a pulse pattern that can be used for windshear detection. In this way, the scan time already allocated for windshear detection can be reused for incursion detection.

One exemplary embodiment utilizes a 16 KHz continuous transmitter pulse pattern with the antenna sweeping across +/−90 degrees of azimuth space. The antenna elevation at this time can be placed to close to zero degrees. Such a pulse repetition frequency (PRF) allows the full windshear sample range to be examined, while resolving most closing velocity situations. The +/−90 azimuth scan coverage covers the entire threat space for closing targets while providing coverage for the more limited +/−30 scan requirements for windshear operation. Normal weather scans can be intermixed with the dual purpose Windshear/Doppler closing scan. The time sharing of normal weather with the dual purpose scan may be dropped when threats need to be confirmed with an additional radar sweep after possible initial detection.

Alternative scanning parameters can be utilized depending upon design criteria. For example, different frequency pulse patterns can be utilized. System 10 can be designed around the following parameters in one embodiment. Ownship ground speed is generally limited to about 150 kts. A potential Doppler closing target has a maximum speed of 250 kts (speed limit below 10 kft above ground level (AGL)). These speeds imply a maximum closing speed of 150+250=400 kts. To sample 400 kts, a PRF greater than 2*400*31.1 Hz/Kts=24.8 KHz can be used. However, such a high pulse rate can produce a blind range of about 3.25 nautical miles which may not meet 5 nautical mile nominal requirement for windshear detection.

The preferred 16 kHz system can leave closing velocities greater than 257 kts ambiguous with opening velocities above 257 kts. This ambiguity can be handled in several ways. In one embodiment, the detection occurs at one sweep with the predicted target location confirmed with the next sweep assuming the estimated closing rate. For targets that are opening, the target will not be confirmed on the next sweep.

Weather radar system 100 can be similar to the systems described in U.S. Pat. Nos. 6,850,185, 6,603,425 and 6,388,608. In one embodiment, system 100 is a multi-scan system manufactured by Rockwell Collins, Inc. and configured to include an obstacle presence detector 114 and weather phenomenon detector 212 where detectors 114 and 212 each use returns from a scan pattern. A multi-scan system storing data such as volumetric systems manufactured by Honeywell, Inc. could be configured to include detectors 114 and 212 without departing from the scope of the invention. Other embodiments could include a normal single beam radar system with either manual or automatic antenna elevation control without departing from the scope of the invention.

Weather radar system 100 includes a weather radar receiver/transmitter 102, a weather radar adjustable antenna 104, a processor 208, and a multi-scan, multi-tilt angle, memory 206. System 100 also includes a tilt control 203 for automatically controlling the tilt angle (mechanical or electronic) of the antenna 104; this auto control may include an additional manual control feature as well.

Memory 206 is preferably capable of storing in a readily addressable and rapidly retrievable manner, data sets resulting from antenna sweeps and can be a multi-scan, multi-tilt angle memory. Although preferred types of memory are discussed as memory 206, system 100 can utilize any type of storage system capable of storing radar returns or associated data for analysis/processing by processor 208. In one alternative embodiment, memory 206 can be a volumetric storage unit.

The data in memory 206 or other storage unit can be used by processor 208 to determine hazards, weather and objects that should be displayed on display 110. Display 110 can be part of an avionic multi-function display (MFD) unit.

Processor 208 can be digital signal processor utilized in a multi-scan, multi-tilt angle weather radar system and can perform the customary functions performed by a conventional weather radar return processing unit, plus it can perform several additional operations based upon the additional data available in a multi-scan, multi-tilt angle-type of memory 206. In general, processor 208 can merge or cross qualify portions, or ranges, of the radar returns of several different antenna sweeps at several different tilt angles, so that a single relatively clutter-free image is presented to the pilot based upon the several separate scans.

System 100 can operate according to the scanning process of U.S. Pat. No. 6,850,185 or U.S. patent application Ser. No. 10/941,616. Preferably, processor 208 processes weather radar returns to identify or sense the presence of obstacles in front of or in view of the aircraft. Preferably, processor 102 employs a scan pattern (preferably including a high speed Doppler closing capable type pulse pattern and full +/−90 azimuth type antenna scan pattern) and obtains radar returns that are stored in memory 206. The returns from the scan pattern are utilized by both obstacle presence detector 114 and weather phenomenon detector 212 to provide simultaneous or near simultaneous detection of both obstacles and weather phenomena, such as turbulence and windshear. In one embodiment, the returns are converted to data stored in memory 206 or other unit and the data is processed for obstacle and weather phenomenon detection.

System 100 utilizes software routines to embody obstacle presence detector 114 and weather phenomenon detector 212. Detector 114 can analyze data associated with returns and determine the location of objects detected by system 100 and detector 212 can analyze data associated with returns to determine the presence of weather phenomena. When appropriate, detectors 114 and 212 can provide aural warnings of obstacles or provide visual indications on display 110.

In a preferred embodiment, the routine or routines for detectors 114 and 212 can be executed on one or more digital signal processors associated with system 100. In one embodiment, system 100 uses a hardware platform of a WXR-2100 weather radar system manufactured by Rockwell Collins, Inc. or an RDR 4000 weather radar system manufactured by Honeywell International, Inc. However, the present invention is not limited to any type of hardware platform.

Processor 208 preferably receives an indication of aircraft position from aircraft position sensor 114. Aircraft position sensor 114 can be a GPS or other navigational device which provides a location of the aircraft to processor 208 and detector 212. Alternatively, sensor 114 can receive an indication of the aircraft location from equipment outside of the aircraft or from a control tower. Processor 208 preferably utilizes the aircraft position to determine an absolute position of the obstacle from the relative position sensed by system 100 and to determine weather system 100 is in a terminal area.

Figure 2:
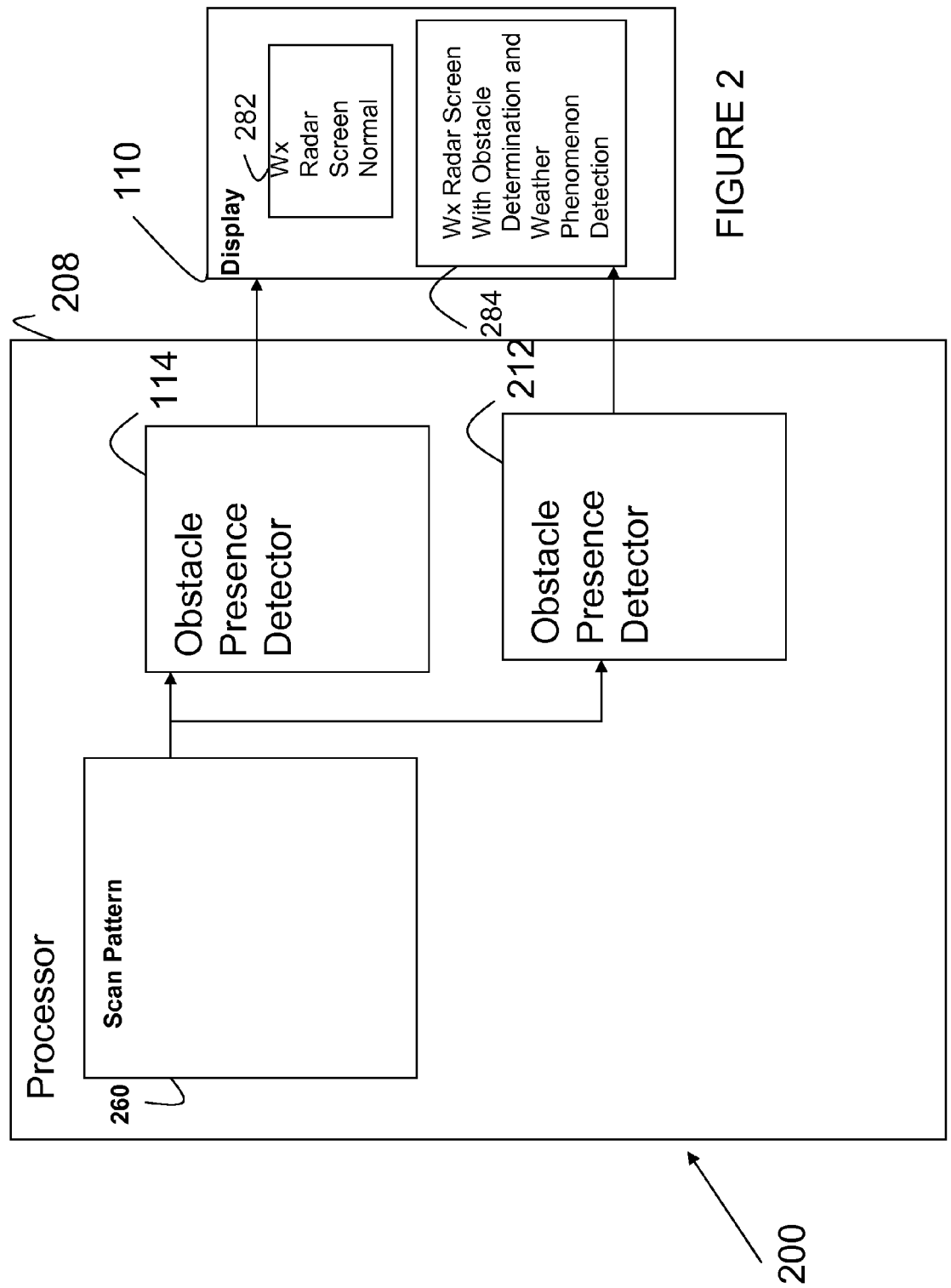
FIG. 2 is a more detailed block diagram of the system illustrated in FIG. 1 in accordance with an exemplary embodiment.

With reference to FIG. 2, processor 208 provides a platform for obstacle presence detector 114 and weather phenomenon detector 212. Processor 208 preferably includes a scan pattern module 260. Scan pattern module 260 initiates a scan pattern (e.g., an antenna scan pattern and/or pulse pattern) which is provided to obtain returns. Preferably, the scan pattern includes a pattern that can support detector 114 and detector 212. In one embodiment, the scan pattern includes a pattern for a Doppler closing function.

Detectors 114 and 212 display the detected objects and detected weather phenomena on display 110. Detectors 114 and 212 can use a special screen 284 on display 110. Screen 282 is a normal weather radar screen and screen 284 is a weather radar screen including obstacle detection and weather phenomenon detection. In addition, an oral warning can be provided through a speaker or other system when obstacle presence detector 212 detects a presence of an object and/or when detector 114 detects weather phenomena, such as a hazard.

Alternatively, screen 284 can include modes dedicated solely to obstacle detection, solely to weather phenomenon detection or to both. In one preferred embodiment, the pilot can toggle between screens 282 and 284 based upon a manual input. Alternatively, screen 284 can automatically be provided on display 110 when the aircraft is in a particular flight mode or in a terminal area.

Figure 3:
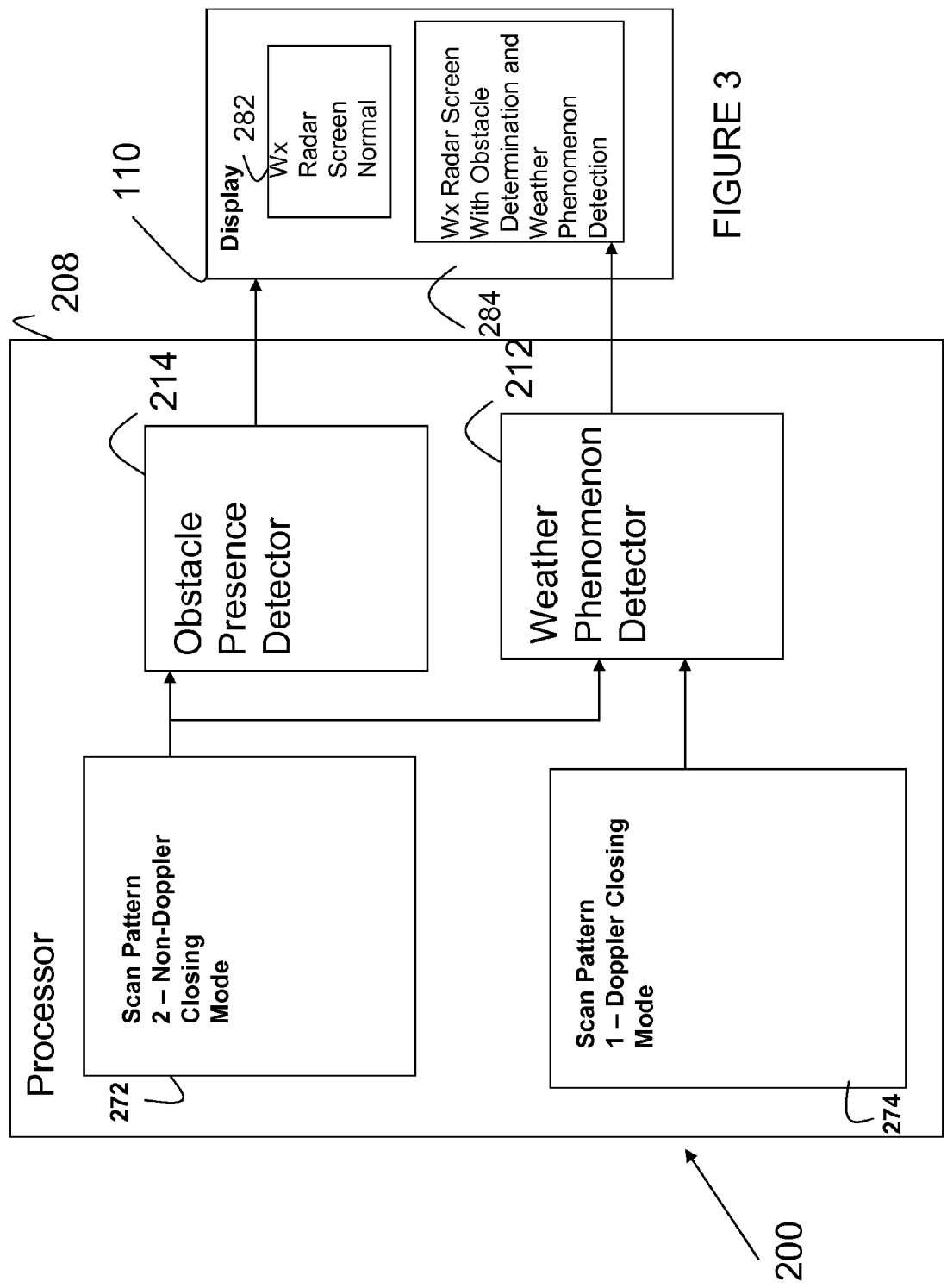
FIG. 3 is a more detailed block diagram of the system illustrated in FIG. 1 in accordance with another exemplary embodiment.

With reference to FIG. 3, processor 208 includes a scan pattern module 272 and a scan pattern module 274. Module 272 provides a scan pattern for which returns are utilized by obstacle presence detector 214 and weather phenomenon detector 212. Scan pattern module 274 provides a scan pattern for which returns are utilized by obstacle presence detector 114.

In the embodiment of FIG. 3, detector 114 utilizes returns from two scan patterns (e.g., preferably a Doppler closing mode pattern and a non-Doppler closing mode pattern). Preferably, the Doppler closing mode pattern can be utilized for both weather phenomenon detection and obstacle presence detection.

In one embodiment, the scan pattern from module 272 (e.g., Doppler closing mode scan pattern) is provided across the majority of the external environment. The pattern provided by module 274 (e.g., non-Doppler mode) can be provided to a relatively narrow region of interest.

Doppler closing mode senses the Doppler frequency difference between ground returns and a closing target to allow the closing target to be differentiated from ground returns. The non-Doppler inclusion modes are used to detect a target that is stationary and not separate from ground returns. Targets in these cases are separated by high spatial resolution radar processing in both range and in angle domains. Threats detected by this non-Doppler mode have limited ground speed and thus are close to the equipped aircraft's trajectory. Thus, the region sampled by this mode tends to have low azimuth extent and moderate range extent. With the small azimuth coverage required by this mode small additional time is required to support the scan pattern from module 274 and the analysis thereof can be tolerated.

Module 260, 272 and 274 are preferably software routines that define the tilt angles and azimuth angles for the scan. Modules 260, 272, and 274 can also define a pulse pattern.

Figure 4:
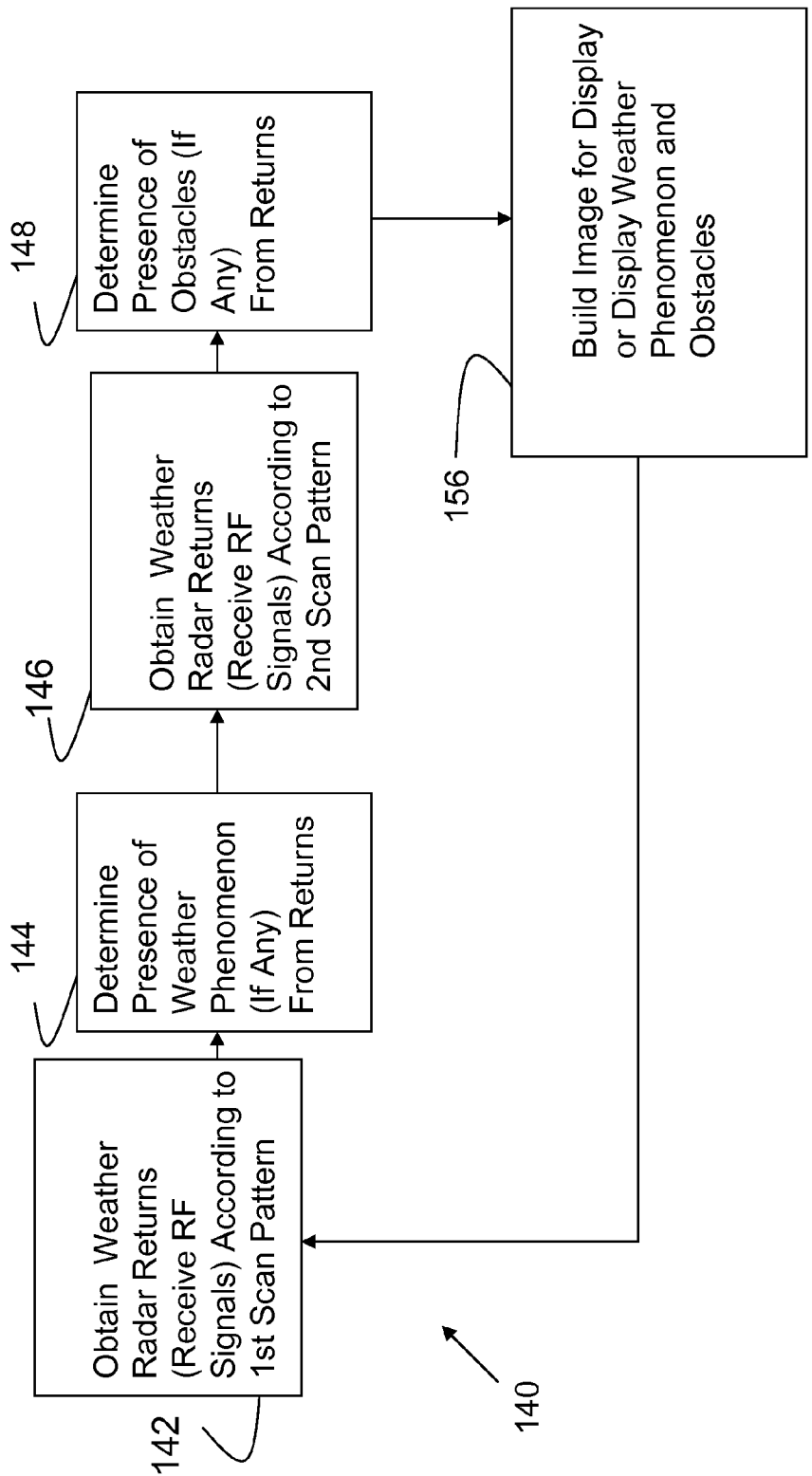
FIG. 4 is an exemplary process diagram for the system illustrated in FIG. 1.

With reference to FIG. 4, a flow chart 140 shows general operation of system 100 providing simultaneous or near simultaneous obstacle presence detection and weather phenomenon detection. Preferably, detection is performed in real time or pseudo real time. At a step 142, weather radar returns are obtained by system 100 using a first scan pattern across the majority of the external environment (a Doppler closing mode pattern). At a step 144, system 100 can determine the presence of any weather phenomena from data from the radar returns.

At a step 146, system 100 obtains weather radar returns associated with a second scan pattern (e.g., preferably a non-Doppler closing mode pattern across a narrow region of interest). At a step 148, the presence of obstacles is determined utilizing data from the returns from step 142 and data from the returns from step 146. At a step 156, an image for display 110 or a display of weather phenomena and obstacles is built or provided. After step 156, system 100 returns to step 142.

System 100 can advantageously utilize data collected for both the weather phenomenon detection and obstacle detection. Accordingly, system 100 not only provides the advantage of reducing the processing time associated with obstacle detection and weather phenomenon detection, but it provides an advantage during the development process of system 100. Data collection needed to support both the weather phenomenon detection and obstacle detection can be used for both processes. In addition, data archives from previous weather phenomenon certifications (e.g., windshear certifications) can be utilized to begin the development process.

System 100 can perform the various steps in flowchart 140 in parallel. For example, steps 144 and 146 can be performed in parallel as can steps 148 and 142 depending upon software design criteria. In addition, the order of the steps in flow chart 140 can be changed. For example, steps 142 and 144 can be after step 146.

While the detailed drawings, specific examples and particular formulations given describe preferred and exemplary embodiments, they serve the purpose of illustration only. The inventions disclosed are not limited to the specific forms shown. For example, the methods may be performed in any of a variety of sequence of steps. The hardware and software configurations shown and described may differ depending on the chosen performance characteristics and physical characteristics of the computing devices. For example, the type of computing device, communications bus, or processor used may differ. Further, the configuration shown and described in the block diagram may be varied without departing from the scope of the invention. The systems and methods depicted and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. An aircraft radar system, comprising:
    a radar antenna;
    a processing device receiving first returns from the radar antenna associated with a scan, the processing device using the first returns from the scan for use in both incursion detection and weather phenomenon detection, wherein the scan includes a Doppler closing mode pulse pattern for a full azimuth scan;
    wherein the processing device processes Doppler closing mode data for use in both the incursion detection and the weather phenomenon detection;
    wherein the same pulse pattern and antenna scan pattern are used for the first returns; and
    wherein the processing device causes another scan to be performed to provide non-Doppler data.

2. The aircraft radar system of claim 1, wherein the weather phenomenon is related to turbulent, windshear or micro-burst detection.

3. The aircraft radar system of claim 1, wherein the processing device uses both the non-Doppler data and the Doppler data to detect incursions.

4. A sensing system for an aircraft, the sensing system comprising:
    means for receiving returns associated with a scan;
    means for providing data in response to the scan;
    means for providing a turbulence, wind shear or micro burst warning in response to the data and for providing a runway or taxiway obstacle warning at least partially in response to the data, wherein the scan includes a Doppler closing mode pulse pattern for a full azimuth scan;
    wherein the runway or taxiway obstacle warning is provided at least partially in response to second data from a second scan; and
    wherein the second data is non-Doppler data.

5. The sensing system of claim 4, wherein the sensing system is part of a weather radar system.

6. The sensing system of claim 4, wherein the data is stored in a memory in a weather radar system.

7. The sensing system of claim 6, wherein the weather radar system is a multi-scanning or volumetric scanning system.

8. The sensing system of claim 4, wherein the data is Doppler closing mode data.

9. The sensing system of claim 4, whereby scanning time is reduced by at least partially merging the runway or taxi way warning function with the turbulence, windshear or microburst warning function.

10. A method of detecting an obstacle on a runway or taxiway and detecting weather phenomenon in takeoff and landing modes, the method comprising:
    performing a first scan in a first scan pattern, wherein the first scan pattern includes a Doppler closing pulse pattern;
    obtaining data from the first scan, the data includes Doppler closing mode data;
    detecting an obstacle on a runway or taxiway and detecting weather phenomenon using the Doppler closing mode data; and
    performing a second scan in a second scan pattern the first scan pattern having a first pulse pattern and the second scan pattern having a second pulse pattern, the second scan pattern being different than the first scan pattern and the second pulse pattern being different than the first pulse pattern.

11. The method of claim 10, further comprising: obtaining second data from the second scan, the second data being non-Doppler mode data.

12. The method of claim 11, wherein the second scan is performed in a smaller region than the first scan.

13. The method of claim 10, wherein a display provides a warning when the obstacle or the weather phenomenon is detected.

14. The method of claim 12 wherein the weather phenomenon is windshear.

15. The method of claim 13 wherein the weather phenomenon is a microburst.

* * * * *